United States Patent
Pelken et al.

(10) Patent No.: US 7,824,060 B2
(45) Date of Patent: Nov. 2, 2010

(54) WIND POWERED DEVICE

(75) Inventors: Paul Michael Pelken, Syracuse, NY (US); Thong Dang, Fayetteville, NY (US)

(73) Assignee: Syracuse University, Syracuse, NY (US)

( * ) Notice: Subject to any disclaimer, the term of this patent is extended or adjusted under 35 U.S.C. 154(b) by 239 days.

(21) Appl. No.: 12/059,231

(22) Filed: Mar. 31, 2008

(65) Prior Publication Data

US 2009/0244890 A1    Oct. 1, 2009

(51) Int. Cl.
*F21S 9/03*    (2006.01)
(52) U.S. Cl. ...................................... 362/183; 362/192
(58) Field of Classification Search ................. 362/183, 362/192; 290/55, 44
See application file for complete search history.

(56) References Cited

U.S. PATENT DOCUMENTS

| | | | |
|---|---|---|---|
| 4,200,904 A | | 4/1980 | Doan |
| 6,448,668 B1 * | | 9/2002 | Robitaille ..................... 290/54 |
| 6,661,113 B1 | | 12/2003 | Bonin |

FOREIGN PATENT DOCUMENTS

| | | |
|---|---|---|
| CN | 200620016391.7 | 12/2006 |
| CN | 200975626 | 12/2007 |
| CN | 200986132 | 12/2007 |
| FR | 2809477 | 11/2001 |
| GB | 2415750 | 4/2006 |
| JP | 08138422 | 5/1996 |
| JP | 2003042052 | 2/2003 |
| KR | 1020060082108 | 7/2006 |
| RU | 2283985 | 9/2005 |
| WO | WO 02/33311 | 4/2002 |
| WO | WO 03/004777 | 1/2003 |
| WO | WO 2006/022590 | 3/2006 |
| WO | WO 2007/113498 | 10/2007 |

OTHER PUBLICATIONS

Green Energy Consulting and Suppyly, LLC www.whesinc.com.
SunrainVision www.sunrainvision.com.
Street Lighting from wind and sun! www.alternativeenergyhq.com.
Success Sun Lamp www.success1313.com.

* cited by examiner

*Primary Examiner*—Sharon E Payne
(74) *Attorney, Agent, or Firm*—George R. McGuire; David L. Nocilly; Bond Schoeneck & King, PLLC

(57) ABSTRACT

A turbine generator having one or more wind turbines for generating energy and a series of plates located above and below each turbine for focusing and converging the wind inwardly. The plates are aerodynamically-designed to converge the wind onto the turbine and provide a strong wind current. The turbine generator is incorporated into a light fixture to provide self-sustaining light energy. Solar panels may be provided in conjunction with the turbine generator to provide an additional source of energy.

5 Claims, 9 Drawing Sheets the commission was created to address growing concern about the accelerating deterioration of the human environment and natural resources and the consequences of that

WIND POWERED DEVICE

BACKGROUND

The present invention relates generally to energy saving devices, and more particularly to wind powered and solar powered devices.

Sustainability is the basic characteristic of a process or a state that can be maintained at a certain level indefinitely. For our planet, it is the intent to provide the best outcomes for the human and natural environments both now and into the indefinite future. The Brundtland Commission, formally the World Commission on Environment and Development (WCED), known by the name of its Chair Gro Harlem Brundtland, was convened by the United Nations in 1983. The commission was created to address growing concern about the accelerating deterioration of the human environment and natural resources and the consequences of that deterioration for economic and social development. In establishing the commission, the UN General Assembly recognized that environmental problems were global in nature and determined that it was in the common interest of all nations to establish policies for sustainable development. The Commission defined sustainable development as a development that "meets the needs of the present without compromising the ability of future generations to meet their own needs." (WCED 1987). The complex term of sustainability relates to the continuity of economic, social, institutional and environmental aspects of human society, as well as the non-human environment.

Alternate energy devices have been developed over the years. Many solar powered and wind driven devices in the industry lack efficiency. Wind driven devices typically require high wind velocities to produce high rotation speeds in order to maintain a constant energy supply. Such speed requirement typically precludes efficient use of wind driven devices in areas in which relatively low wind velocities are present. Additionally, many wind driven devices must be oriented in a certain direction to maintain high rotation speeds.

It is a primary object of the invention to provide a highly efficient, wind powered and solar powered devices. It is another object of the invention to provide wind powered and solar powered devices that are fully self-sustaining and do not need to be connected to existing infrastructures. It is a further object of the invention to provide a light powered by wind and/or solar energy and requires little or no additional energy. It is yet another object of the invention to provide an energy efficient light that can be used in a variety of different buildings and structures.

SUMMARY OF THE INVENTION

These and other objects and advantages are accomplished by a turbine generator having one or more wind turbines for generating energy and a series of plates located above and below each turbine for focusing and converging the wind inwardly. The plates are aerodynamically-designed to converge the wind onto the turbine and provide a strong wind current.

In another aspect of the invention, the turbine generator is incorporated into a light fixture to provide self-sustaining light energy. In yet another aspect of the invention, solar panel are provided in conjunction with the turbine generator to provide an additional source of energy.

BRIEF DESCRIPTION OF THE DRAWINGS

The present invention will be more fully understood and appreciated by reading the following Detailed Description in conjunction with the accompanying drawings, in which.

DETAILED DESCRIPTION

Figure 1:
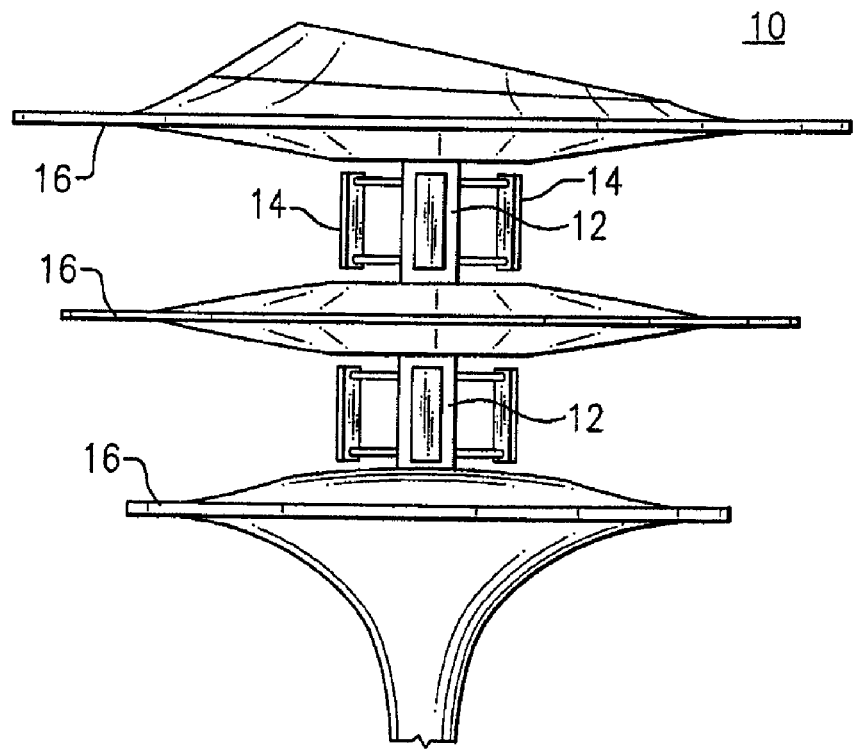
FIG. 1 is a perspective view of the turbine generator of the present invention.
Figure 2:
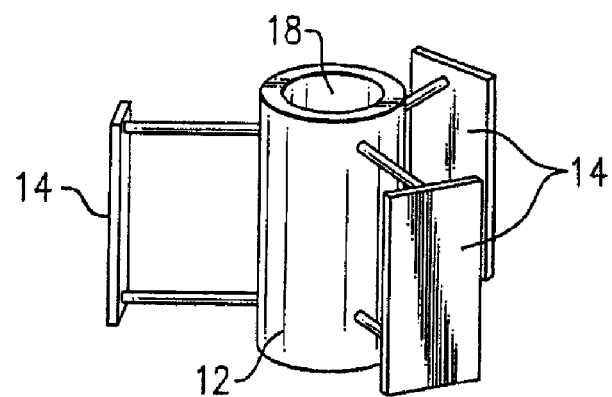
FIG. 2 is a perspective view of the rotary shaft of the turbine generator of FIG. 1.

As will be appreciated, the present invention provides a wind turbine generator 10 having one or more rotary shafts 12, as shown in FIG. 1. Rotary shafts 12 rotate about a rod or pole in either a clockwise or counterclockwise direction. As clearly shown in FIG. 2, rotary shaft 12 has a channel or opening 18 for fitting onto a pole or rod, for rotation thereabout.

Each rotary shaft 12 has a series of blades 14 that react to the wind current to rotate rotary shaft 12. Plates 16 are located above and below each rotary shaft 12. Plates 16 are designed aerodynamically to promote convergence of the wind inward toward blades 14. Plates 16 are shown as circular or disc-shaped, although other shapes may be used as long as the aerodynamic effect is achieved. The central portion of plates 16 is greater in thickness, which thickness is substantially constant and begins to taper off to a point proximate the edge. The peripheral edge around the perimeter of plate 16 is very thin. The shape of plates 16 attracts air current. The force of the air current or wind drives blades 14 to rotate rotary shaft 12, thereby generating energy. The thin edge of plates 14 allows for a high volume of wind as it flows towards the rotary shaft. The wind turbine generator 10 is also impervious to the changing wind direction.

Figure 3:
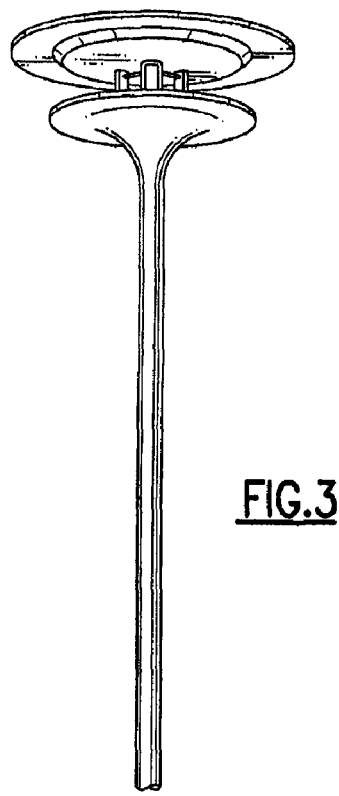
FIG. 3 is a perspective view of an embodiment of a street light with the turbine generator of the present invention.
Figure 4:
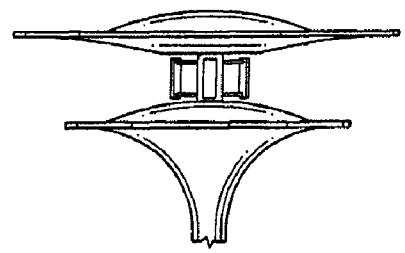
FIG. 4 is a perspective view of the plates in the turbine generator of FIG. 3.
Figure 5:
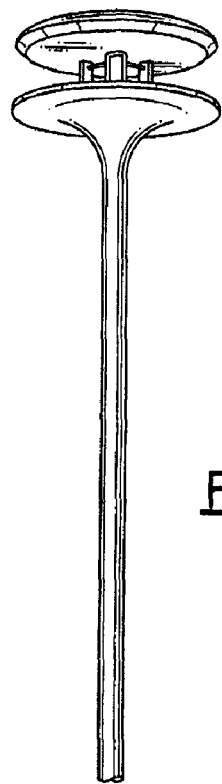
FIG. 5 is a perspective view of an alternate embodiment of a street light with the turbine generator of the present invention.
Figure 6:
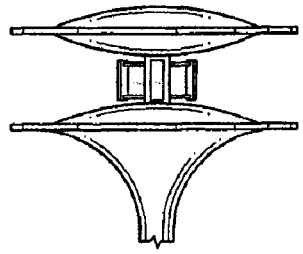
FIG. 6 is a perspective view of the plates in the turbine generator of FIG. 5.
Figure 7:
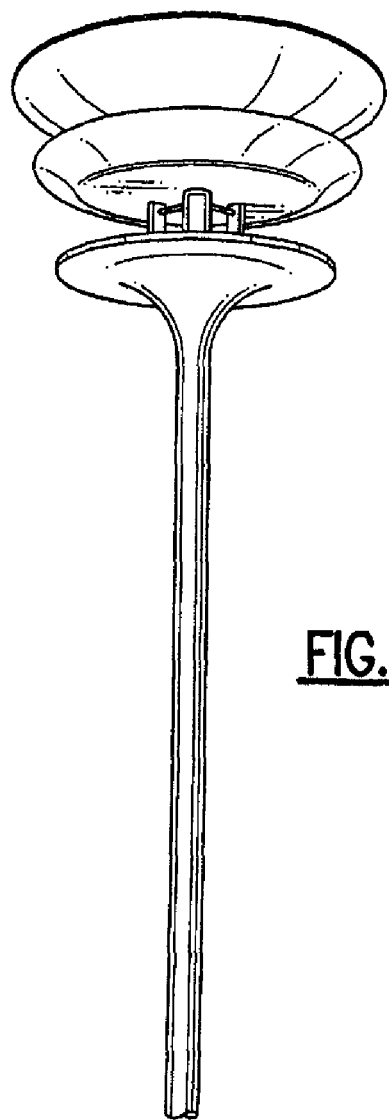
FIG. 7 is a perspective view of an alternate embodiment of a street light with the turbine generator of the present invention.
Figure 8:
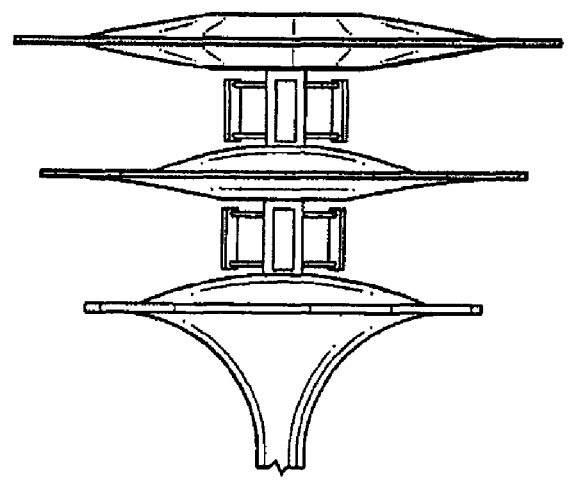
FIG. 8 is a perspective view of the plates in the turbine generator of FIG. 7.
Figure 9:
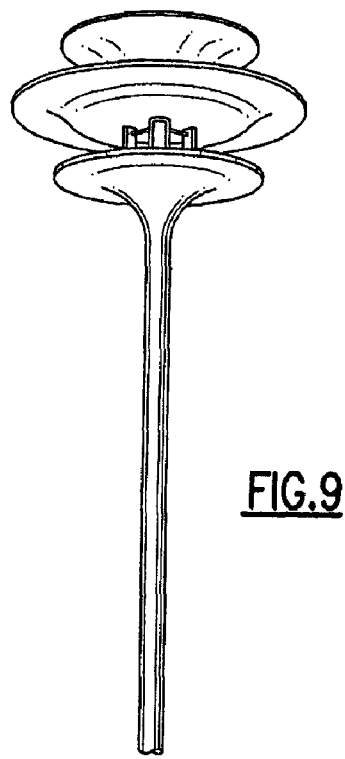
FIG. 9 is a perspective view of an alternate embodiment of a street light with the turbine generator of the present invention.
Figure 10:
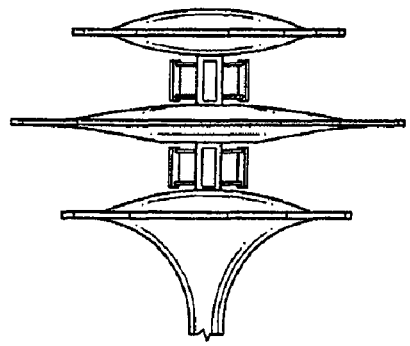
FIG. 10 is a perspective view of the plates in the turbine generator of FIG. 9.
Figure 11:
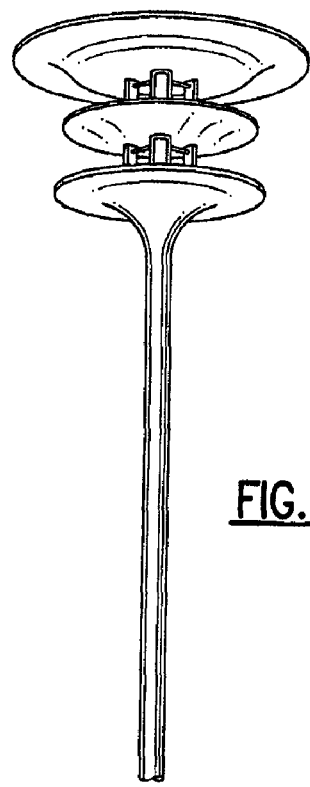
FIG. 11 is a perspective view of an alternate embodiment of a street light with the turbine generator of the present invention.
Figure 12:
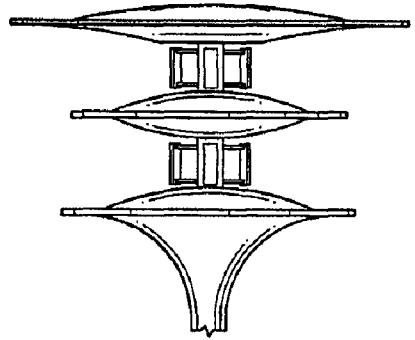
FIG. 12 is a perspective view of the plates in the turbine generator of FIG. 9.

One preferred embodiment is directed to the use of wind turbine generator 10 in a light. FIGS. 3 through 12 illustrate various turbine assemblies for incorporation in a light fixture. FIGS. 3 and 5 show a rotary shaft with blades positioned between an upper and lower plate. FIG. 4 shows a front plan view of the plates used in the generator of FIG. 3, with the top plate being larger than the bottom plate. FIG. 6 shows a front plan view of the plates used in the generator of FIG. 5, with the top plate being slightly smaller than the bottom plate. All of the plates have the same aerodynamic shape represented by a thicker central region and much thinner periphery to guide and converge the wind current inward toward the blades.

FIGS. 7 through 12 illustrate various turbine assemblies having two wind turbines each positioned between two plates for a total of three plates. Even though the plates may vary in size and location, all of the plates have the same aerodynamic shape to provide strong and consistent air current for movement of the blades and rotation of the rotary shaft.

Figure 13:
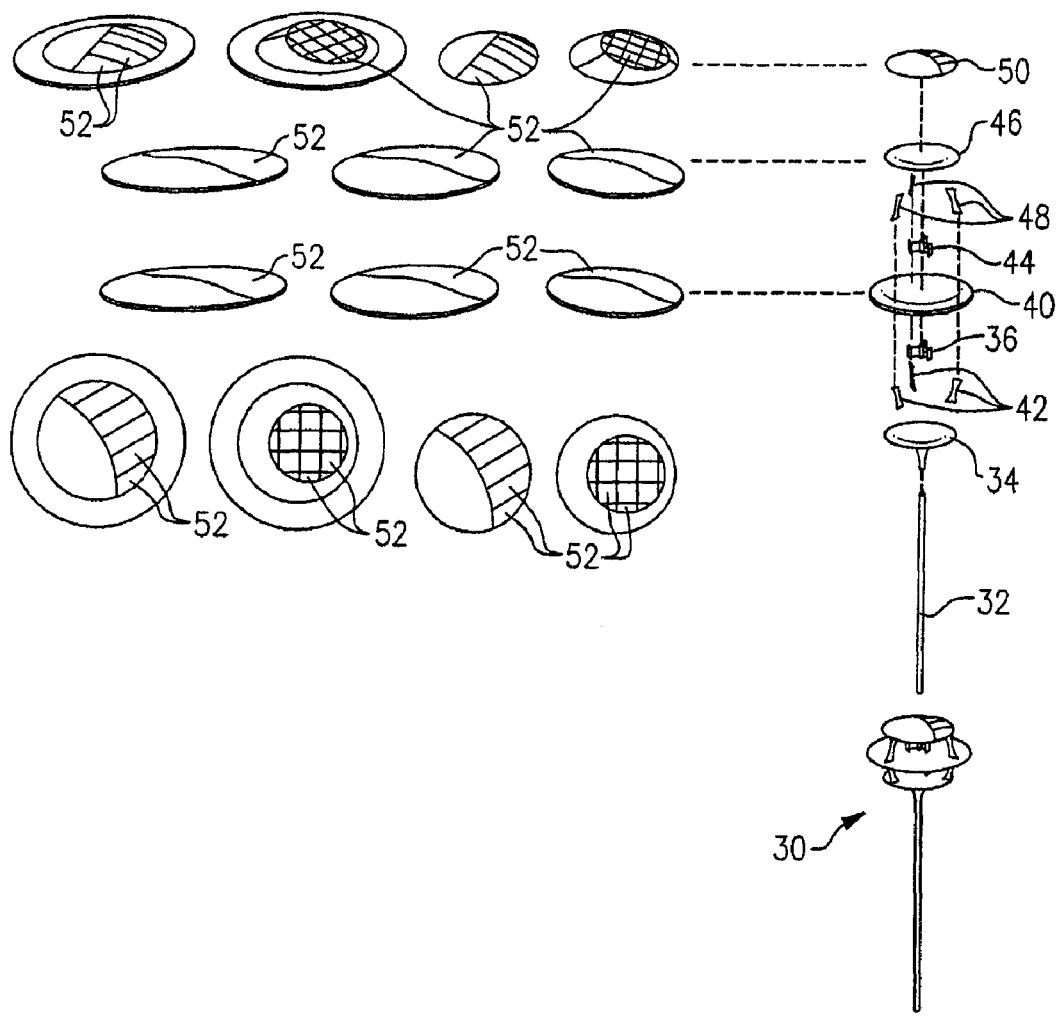
FIG. 13 is an exploded view of an embodiment of a street light with the turbine generator of the present invention.
Figure 14:
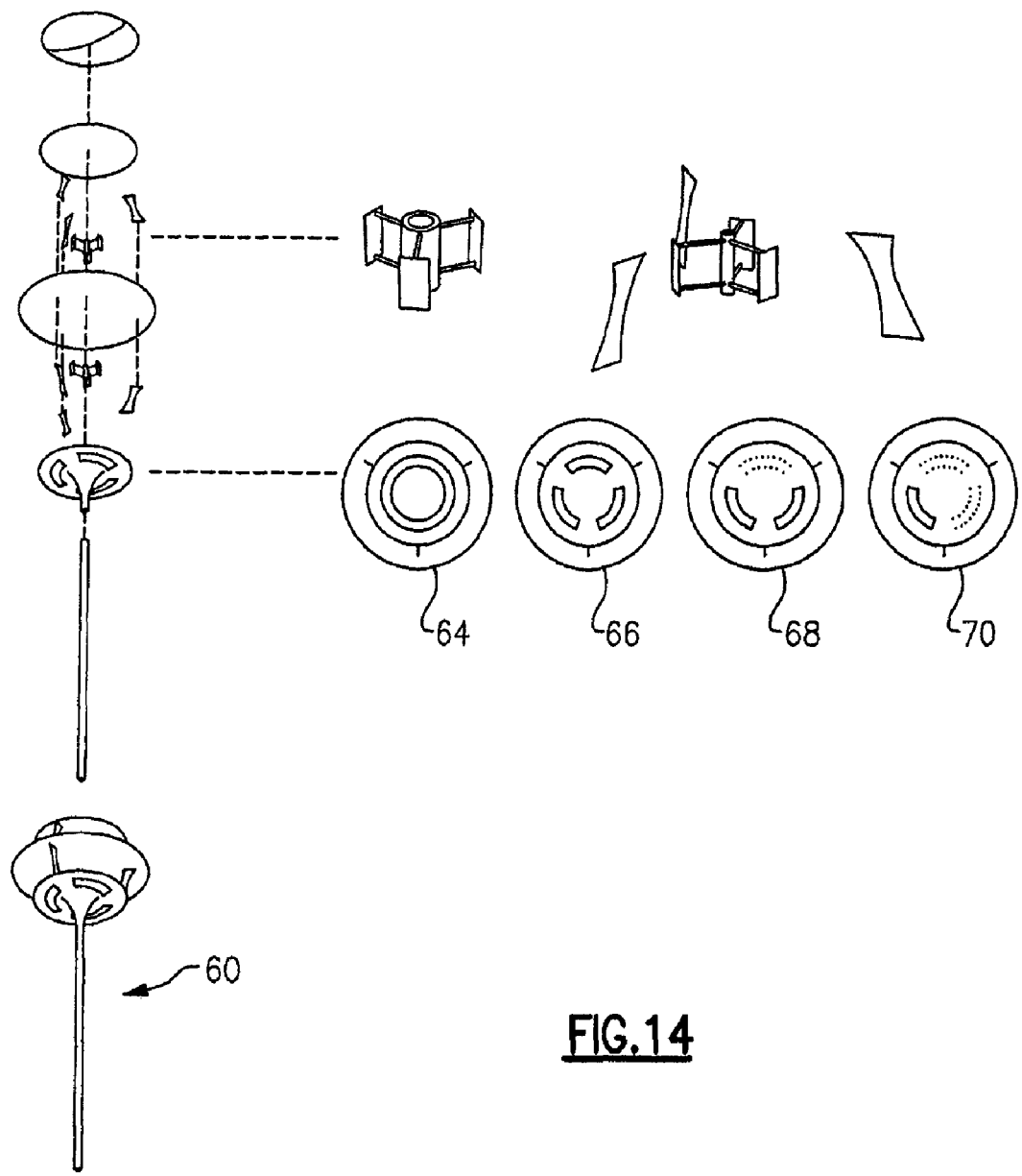
FIG. 14 is an exploded view of an alternate embodiment of a street light with the turbine generator of the present invention.
Figure 15:
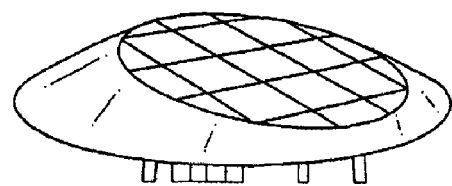
FIG. 15 is a perspective view of a plate in the turbine generator of the present invention with a solar energy panel assembly.
Figure 16:
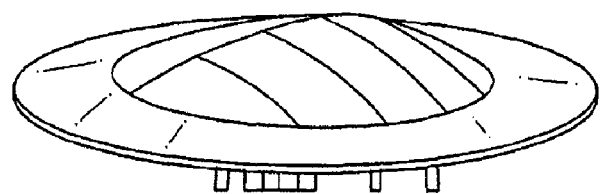
FIG. 16 is a perspective view of an alternate embodiment of a plate in the turbine generator of the present invention with a solar energy panel assembly.
Figure 17:
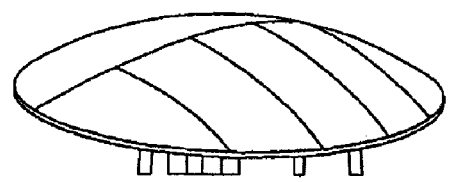
FIG. 17 is a perspective view of an alternate embodiment of a plate in the turbine generator of the present invention with a solar energy panel assembly.
Figure 18:
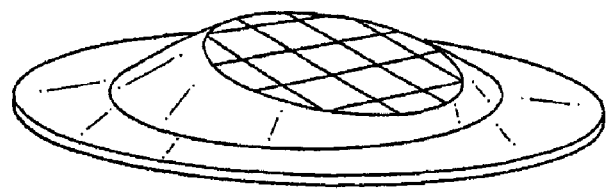
FIG. 18 is a perspective view of an alternate embodiment of a plate in the turbine generator of the present invention with a solar energy panel assembly.
Figure 22:
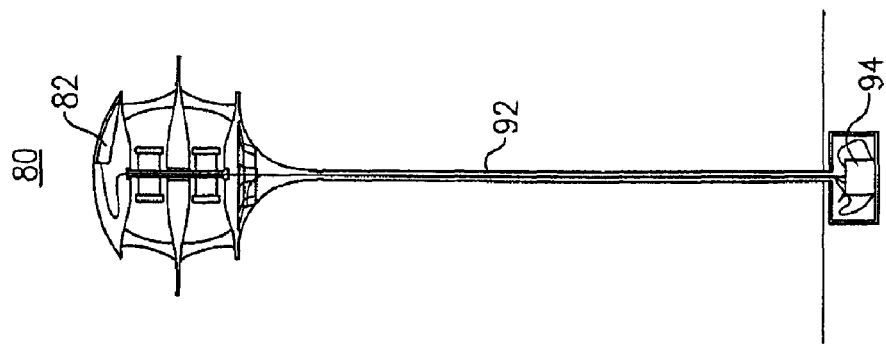
FIG. 22 is perspective view of a street light with a turbine generator of the present invention showing the storage of the mechanics and the wiring of the light.
Figure 21:
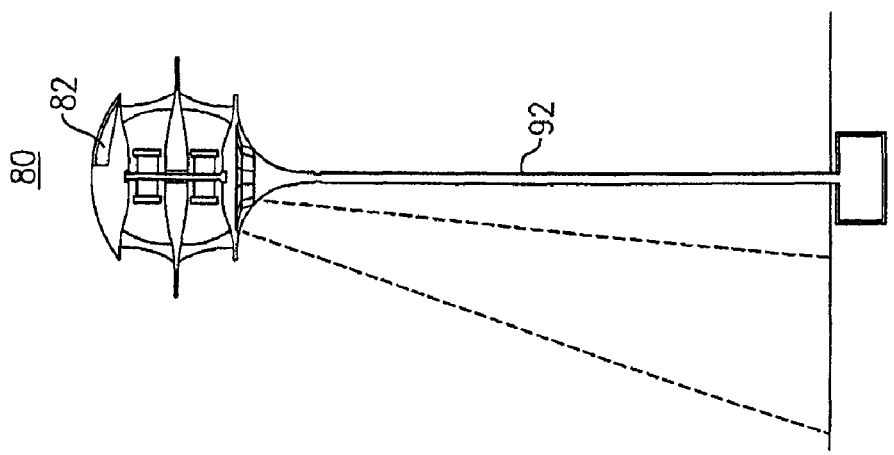
FIG. 21 is a perspective view of a street light with a turbine generator of the present invention showing energy transferred to a streetlight.
Figure 20:
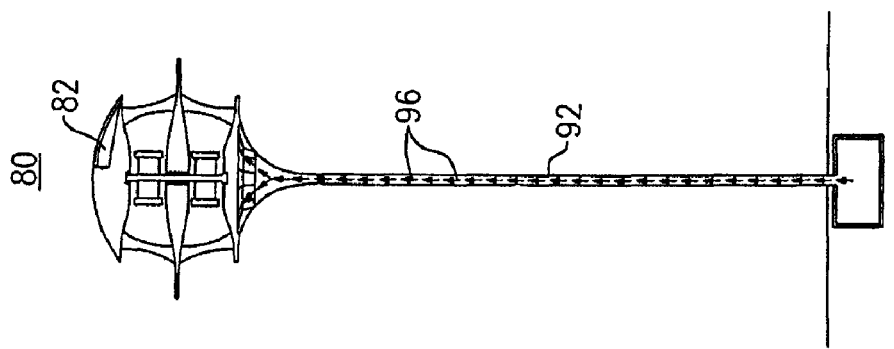
FIG. 20 is a perspective view of a street light with a turbine generator of the present invention showing stored energy delivered to a streetlight.
Figure 19:
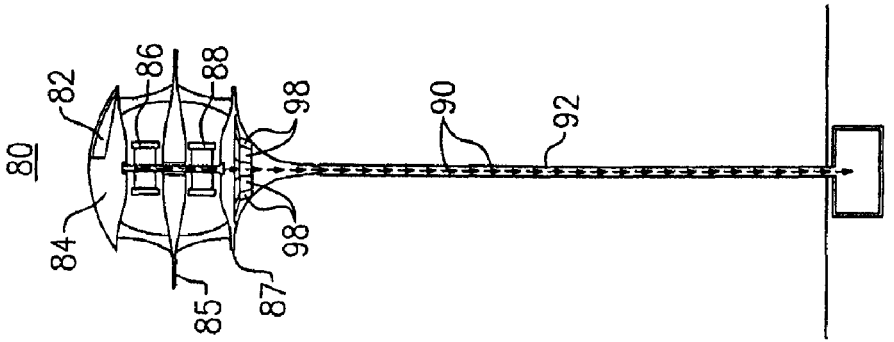
FIG. 19 is a perspective view of a street light with a turbine generator of the present invention showing solar energy absorption.

FIGS. 13 and 14 are exploded views of various embodiments of wind generator assemblies of the present invention. FIG. 13 shows assembly 30 having a rod or pole 32 upon which a lower plate 34 is positioned. Wind turbine 36 is positioned above plate 32. A second or middle plate 40 is positioned above turbine 34. A series of fins 42 are used to support plate 40 above turbine 36. A second turbine 44 is positioned above plate 40 and a third plate 46 is positioned above turbine 44. Support fins 48 may be placed between the second and third plates to support the third plate 46. A cover 50 may be positioned on third plate 46 to protect plate 46 and also provide solar energy options. Any or all of plates 34, 40, 46 and cover 50 may have one or more solar panels 52 to provide additional energy for conversion to electrical energy. As shown in FIG. 13, there are many combinations, patterns and shapes of solar panels that can be used in the plates and cover herein.

FIG. 14 shows yet another option for a wind turbine assembly 60 for use as a light. Two turbines are disposed between upper and lower plates. The bottom or lower plate 62 in FIG. 14 has a series of lights, such as light emitting diodes (LEDs) positioned on the bottom face of plate 62. Variations of types of lights, light positions, shapes and number of lights are also shown in FIG. 14 at 64, 66, 68 and 70. Any type of light, including but not limited to, incandescent, fluorescent, halogen and led lights, may be used as the illuminating component of the light.

FIGS. 15 through 18 shows additional embodiments of solar panels which may be used on the plates or as a cover for the light assembly. As shown, the panels may extend to the edge of the plate or cover, or may be positioned proximate the center of the plate or cover in a full or semi-circular design.

Reference is made to FIGS. 19 through 22 which illustrate the energy path and transfer in the light fixture assembly. Light assembly 80 is shown with solar panel 82 on top plate 84 and two wind turbines 86 and 88, located, respectively, between top plate 84, middle plate 85 and bottom plate 87. Energy 90 created from solar panel 82 and wind turbines 86 and 88, is converted into electrical energy by a electrical energy generator and is sent down pole 92 to a power storage assembly 94. At night, energy 96 is sent up to lights 98 for lighting the surrounding area.

Figure 23C:
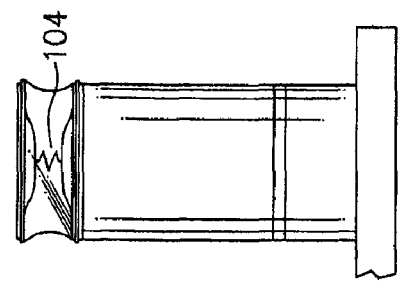
FIG. 23 is a perspective view of alternate embodiment of the turbine generator of the present invention used in a bus shelter.
Figure 23B:
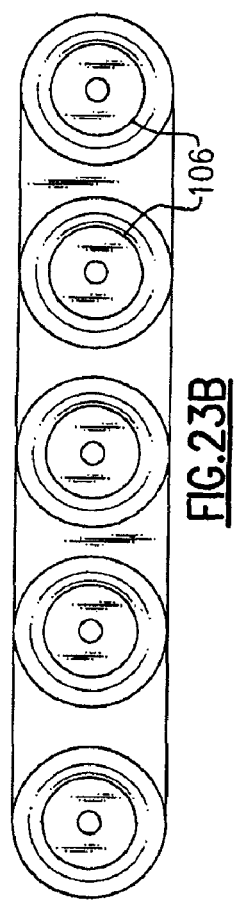
Figure 23A:
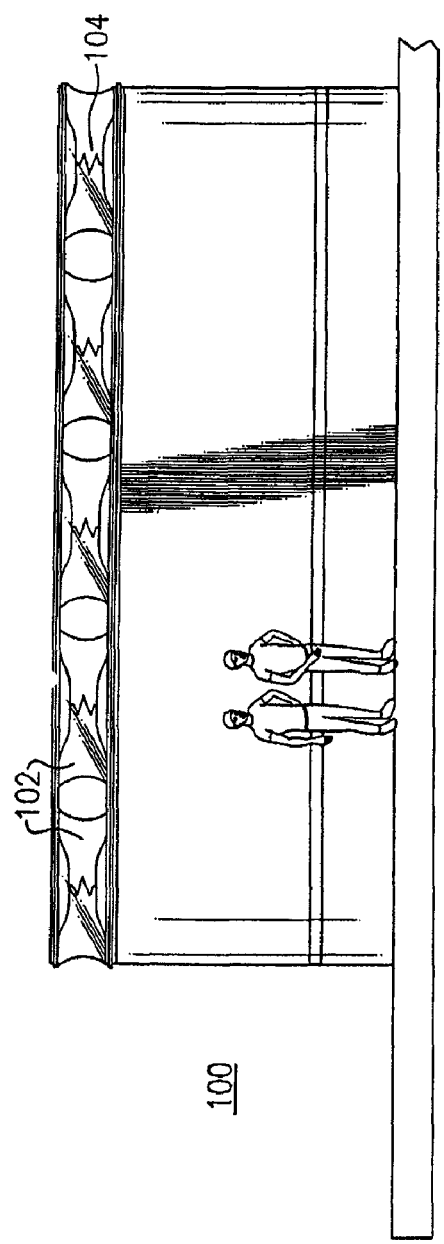

FIG. 23 further illustrates and exemplifies other uses of the turbine system herein. A bus shelter 100 is shown having light assemblies 102 that incorporate the turbine assembly 104 of the present invention. LEDs 106 are used to illuminate the light, which are powered by electrical energy converted from the wind energy produced by the wind turbine. The wind turbine assembly of the present invention is useful for many of today's energy demands including lighting assemblies in a variety of locations, buildings and other structures.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended embodiments.

What is claimed is:

1. A turbine generator apparatus comprising:
   at least one wind turbine having a plurality of blades that rotates about an axis to define a blade path;
   a first stationary plate positioned above said blades and having a lower surface that extends radially outward from said axis past said blade path;
   a second stationary plate positioned below said blades and having an upper surface that extends radially outward from said axis past said blade path;
   wherein the distance between said lower and said upper surfaces decreases from first and second peripheral edges toward said blade path to define a convergent passageway and the distance between said lower and said upper surfaces is substantially constant within said blade path;
   a solar panel assembly affixed to said first plate; and
   a light assembly electrically interconnected to said wind turbine and said solar panel assembly.

2. The turbine generator apparatus of claim 1 wherein said turbine comprises a main rotary shaft and a series of blades extending from the main rotary shaft, wherein the series of blades are positioned equidistant from one another.

3. The turbine generator apparatus of claim 2 further comprising a generator operationally coupled to said turbine for converting wind energy into electrical energy and a power storage assembly being operationally coupled to said turbine for storing the energy created by the wind turbines.

4. A light fixture comprising:
- at least one wind turbine having a plurality of blades that rotate through a blade path;
- a first stationary plate positioned above said blades and having a lower surface that extends radially outward from said axis past said blade path to a first peripheral edge;
- a second stationary plate positioned below said blades and having an upper surface that extends radially outward from said axis past said blade path to a second peripheral edge;
- wherein the distance between said lower and said upper surfaces decreases from first and second peripheral edges toward said blade path to define a convergent passageway and the distance between said lower and said upper surfaces is substantially constant within said blade path;
- an electrical energy generator operationally coupled to said wind turbine for converting the wind energy to electrical energy;
- a light assembly comprising one or more lights; and
- a power storage assembly coupled to the electrical energy generator and the light assembly for providing power to the light assembly.

5. The light assembly of claim 4 further comprising
- a solar assembly fixed attached to said first plate and adapted for collecting solar radiation and operationally coupled to the electrical energy generator for converting the solar radiation into electricity.

\* \* \* \* \*